United States Patent
Park et al.

(10) Patent No.: US 9,264,993 B2
(45) Date of Patent: Feb. 16, 2016

(54) METHOD FOR SAVING POWER OF A FEMTO BASE STATION USING SLEEP PERIOD SYNCHRONIZATION

(75) Inventors: Gi Won Park, Anyang-si (KR); Yong Ho Kim, Anyang-si (KR); Ki Seon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1039 days.

(21) Appl. No.: 13/139,574
(22) PCT Filed: Dec. 15, 2009
(86) PCT No.: PCT/KR2009/007507
§ 371 (c)(1),
(2), (4) Date: Jun. 14, 2011
(87) PCT Pub. No.: WO2010/071347
PCT Pub. Date: Jun. 24, 2010

(65) Prior Publication Data

US 2011/0244792 A1 Oct. 6, 2011

Related U.S. Application Data

(60) Provisional application No. 61/122,412, filed on Dec. 15, 2008.

(30) Foreign Application Priority Data

Mar. 4, 2009 (KR) .................. 10-2009-0018650
Jul. 17, 2009 (KR) .................. 10-2009-0065394

(51) Int. Cl.
*H04B 1/38* (2015.01)
*H04W 52/02* (2009.01)
*H04W 84/04* (2009.01)

(52) U.S. Cl.
CPC ...... *H04W 52/0216* (2013.01); *H04W 52/0206* (2013.01); *H04W 84/045* (2013.01); *Y02B 60/50* (2013.01)

(58) Field of Classification Search
CPC .................. H04W 52/0206; H04W 52/0216; H04W 84/045; Y02B 60/50
USPC .......... 455/39, 73, 420, 426.1, 561, 458, 515, 455/574
See application file for complete search history.

(56) References Cited

U.S. PATENT DOCUMENTS 7,944,867 B2   5/2011   Usuba
8,310,971 B2   11/2012  Kim et al.
(Continued)

FOREIGN PATENT DOCUMENTS

JP   2002-158609 A   5/2002
JP   2008-515327 A   5/2008
(Continued)

*Primary Examiner* — Yuwen Pan
*Assistant Examiner* — Fatuma Sherif
(74) *Attorney, Agent, or Firm* — Birch, Stewart, Kolasch & Birch, LLP

(57) ABSTRACT

The present invention relates to a wireless access system, and more particularly, to a method for saving power of a femto base station. The present invention includes obtaining reference synchronization information used in a prescribed area to enable a first femto base station to perform a sleep mode operation, shifting to a sleep mode if a mobile station does not exist within the first femto base station, and enabling the first femto base station to be synchronized with at least one second femto base station belonging to the prescribed area using the reference synchronization information, wherein each of the femto base stations included in the prescribed area achieves synchronization of the sleep mode operation using the reference synchronization information. Accordingly, it is able to minimize power consumption of a femto base station and interference with a macro cell in a wireless access system supporting a femtocell. And, a mobile station within a femtocell is able to perform reliable communications.

7 Claims, 11 Drawing Sheets

(56) References Cited

U.S. PATENT DOCUMENTS

| | | | |
|---|---|---|---|
| 2007/0099635 A1* | 5/2007 | Mohanty et al. | 455/458 |
| 2007/0242786 A1 | 10/2007 | Kim et al. | |
| 2008/0107056 A1* | 5/2008 | Choi et al. | 370/311 |
| 2008/0232293 A1* | 9/2008 | Mooney et al. | 370/312 |
| 2009/0086691 A1* | 4/2009 | Balasubramanian | 370/338 |
| 2009/0097428 A1* | 4/2009 | Kneckt et al. | 370/311 |
| 2010/0056184 A1* | 3/2010 | Vakil et al. | 455/456.5 |
| 2010/0070786 A1* | 3/2010 | Qing et al. | 713/321 |
| 2010/0110979 A1* | 5/2010 | Chen et al. | 370/328 |

FOREIGN PATENT DOCUMENTS

| | | |
|---|---|---|
| KR | 10-2007-0078279 A | 7/2007 |
| KR | 10-2008-0100616 A | 11/2008 |
| WO | WO 2006/088135 A1 | 8/2006 |
| WO | WO 2008/023943 A1 | 2/2008 |

* cited by examiner

METHOD FOR SAVING POWER OF A FEMTO BASE STATION USING SLEEP PERIOD SYNCHRONIZATION

This application is the National Phase of PCT/KR2009/007507 filed on Dec. 15, 2009, which claims the benefit under 35 U.S.C. 119(e) of U.S. Provisional Application No. 61/122,412 filed on Dec. 15, 2008, and claims priority under 35 U.S.C. 119(a) to Patent Application Nos. 10-2009-0018650 and 10-2009-0065394 filed in the Republic of Korea on Mar. 4, 2009 and Jul. 17, 2009, respectively. All of which are hereby expressly incorporated by reference into the present application.

TECHNICAL FIELD

The present invention relates to a wireless access system, and more particularly, to a method for saving power of a femto base station.

BACKGROUND ART

In the following description, a femtocell is schematically explained.

First of all, 'femto' indicates a very small unit of 10 to 15. According to the meaning, a femtocell means a ultra-small/low power, home/business indoor base station. The femtocell is used in a meaning similar to that of a picocell but is used in a meaning of a further advanced function. The femtocell is a small cellular base station connected to a wideband router and is able to connect speech and data of the 3G system as well as the conventional 2G system to a backbone network of a mobile communication service provider through DSL link or the like.

The femtocell provides the following advantages.

First of all, many attentions are paid to the recent report saying that a femtocell accelerates the 3G propagation and triggers of extending indoor coverage. It is expected that the number femtocell terminal users will be incremented up to 102,000,000 and that the number of installed access points (AP) will reach about 32,000,000. And, Stewart Callow, first analyst of ABI Research said, "In aspect of technology, the indoor coverage reinforcement of technology such as W-CDMA, HSPDA, EVDO and the like plays a very important role in providing service." And, Stewart Callow also said, "Femtocell performs routing on traffics through IP network to considerably reinforce network quality and capability. Simultaneously, OPEX invested to backhaul dedicated lines by mobile carriers is reduced to provide great benefits in strategic and economic aspects."

The femtocell is able to improve cell coverage and is also able to enhance a quality of voice service. The mobile carriers expect that subscribers will be completely adaptable to 3G by providing data services via femtocells. The femtocell can be called a femto base station (hereinafter abbreviated FBS) or a femto base transceiver station (hereinafter abbreviated BTS).

In summary, the femtocell provides the following advantages.
1. Cell coverage improvement
2. Infrastructure cost decrease
3. New service offering
4. FMC (fixed mobile convergence) acceleration At least one femtocell is grouped per specific service or region to construct a femtocell group. For instance, a femtocell group granting an access to a specific mobile station only can be called a closed subscriber group (hereinafter abbreviated CSG). A femto base station (FBS) checks a CSG ID of a mobile station and is then able to grant an access to a mobile station having subscribed to a CGS only.

FIG. 1 is a diagram for an example of a network structure including a femto base station (FBS) according to a related art.

First of all, a femto base station is an entity newly added to a conventional network. As the femto base station is used, there are some addable or modifiable matters for an overall network structure. The femto base station directly accesses Internet and is then able to perform almost every function of a base station. Therefore, the femto base station is able to perform almost every function of a general macro base station. Moreover, the femto base station receives data from a general macro base station and is then able to play a role in relaying the received data to a mobile station.

FIG. 1 shows that a femto network gateway (FNG) is added to a conventional network structure. The FNG is able to communicate with an ASN (access service network) gateway and a CSN (connectivity service network). The FNG uses an Rx interface to communicate with the ASN and is also able to use an Ry interface to communicate with the CSN.

The femto base station directly access TCP/IP interne network and is then able to receive a service from the CSN via the FNG. A mobile station connected to the femto base station is able to receive a service of such function as authentication, IMS (IP multimedia subsystem) and the like from the FNG or CSN.

The femto base station is connected to a base station via R1 interface. This indicates that the femto base station is able to receive a downlink (DL) channel of a macro base station. And, the femto base station is able to transmit a control signal to the macro base station.

DISCLOSURE OF INVENTION

Technical Problem

Generally, a broadband wireless access system fails to consider power consumption of a macro base station (macro BS). Yet, in femtocell supported environment, the number of mobile stations supported by one femtocell is limited (e.g., about 5 to 6 mobile stations). Occasionally, a mobile station maintaining a connection for specific duration may not exist.

If the above-described situations repeatedly take place, a femtocell continues to provide a prescribed service to a specific mobile station that does not require the corresponding service. Therefore, power may be unnecessarily consumed. Moreover, in case that femto base stations use the same frequency band in a femto-system, interference may be generated among neighbor femto base stations.

Accordingly, the present invention is directed to a method for saving power of a femto base station that substantially obviates one or more of the problems due to limitations and disadvantages of the related art.

An object of the present invention is to provide a method of minimizing power consumption of a femtocell in a wireless access system that supports a femtocell.

Another object of the present invention is to provide a method for saving power of a femto base station, by which power consumption and interference with a macro cell can be minimized in case that a mobile station connected to a femtocell does not exist or that all mobile station connected to a femtocell enters an idle mode.

Another object of the present invention is to provide a method for saving power of a femto base station, by which a mobile station is enabled to perform reliable communications if a femtocell is in a power saving mode.

A further object of the present invention is to provide a method for saving power of a femto base station, by which a mobile station is facilitated to perform femto base station scan by synchronizing operational cycles of all femtocells or homogeneous femtocells within a prescribed area.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Technical Solution

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of saving power according to the present invention includes the steps of obtaining reference synchronization information used in a prescribed area to enable a first femto base station to perform a sleep mode operation, shifting to a sleep mode if a mobile station does not exist within the first femto base station, and enabling the first femto base station to be synchronized with at least one second femto base station belonging to the prescribed area using the reference synchronization information, wherein each of the femto base stations included in the prescribed area achieves synchronization of the sleep mode operation using the reference synchronization information.

Preferably, the reference synchronization information includes a sleep cycle, a listening interval and an absolute or relative start frame number. And, the step of shifting to the sleep mode by being synchronized with the reference synchronization information can include the step of shifting to the sleep mode to satisfy the sleep cycle, the listening interval and the absolute or relative start frame number.

More preferably, the reference synchronization information can be set to have a prescribed listening interval and a prescribed sleep cycle with reference to a preset starting point.

More preferably, the reference synchronization information follows the listening interval and sleep cycle set by the first or second femto base station having shifted to the sleep mode in the first place at least.

In this case, the sleep cycle can be divided into an available interval and an unavailable interval.

And, the sleep cycle can include either the available interval o the unavailable interval, which starts in the first place.

Preferably, the synchronizing step can be performed to match the synchronization in a manner that a frame, in which a new sleep cycle of the reference synchronization information comes in the first place since the mobile station does not exist within the first femto base station, is set to a start.

Preferably, the femto base station broadcasts at least one selected from the group consisting of a synchronization channel and a super frame header (SFH) for the available interval in the sleep mode only but does not receive any data by wireless during the unavailable interval. And, the synchronization channel is synchronized with at least one of the first femto base station and the second femto base station.

Preferably, the method further includes the step of transmitting sleep mode information to the mobile station. In this case, the sleep mode information comprises at least one selected from the group consisting of a start frame of the sleep mode, a sleep cycle and a listening interval according to the reference synchronization information.

More preferably, the sleep mode information is transmitted to the mobile station via at least one selected from the group consisting of a super frame header (SFH), additional system information, a ranging response (RNG-RSP) message, a neighbor advertisement (NBR-ADV) message and a femtocell base station low duty mode indication (FCB-LDM-IND) message.

In this case, the neighbor advertisement (NBR-ADV) message and the femtocell base station low duty mode indication (FCB-LDM-IND) message can be unicasted or broadcasted to the mobile station.

And, the prescribed area can include a macro cell area.

Moreover, at least two reference synchronization informations can exist according to a subscriber group type of the femtocell located within the prescribed area.

To further achieve these and other advantages and in accordance with the purpose of the present invention, a method of saving power, in which a mobile station saves the power of a femto base station, includes the steps of receiving a super frame header (SFH) and a synchronization channel from a first femto base station entering a sleep mode by being synchronized with reference synchronization information used for a prescribed area, detecting a cell identifier and CGS identifier of the first femto base station by decoding at least one of the super frame header (SFH) and the synchronization channel, and if the first femto base station is the femto base station to which the mobile station has subscribed to, performing an access to the first femto base station, wherein each of the femto base stations included in the prescribed area achieves synchronization of a sleep mode operation using the reference synchronization information.

Preferably, the reference synchronization information can include a sleep cycle, a listening interval and an absolute or relative start frame number.

More preferably, the step of performing the access to the first femto base station includes the steps of receiving sleep mode information from the first femto base station or a macro base station and obtaining a sleep mode operation timing point of the first femto base station using the received sleep mode information and transmitting a prescribed code or message to the first femto base station.

In this case, the sleep mode information includes at least one selected from the group consisting of a start frame of the sleep mode, a sleep cycle and a listening interval according to the reference synchronization information. And, the prescribed code or message is transmitted to the first femto base station via a preset uplink resource of an available interval in the sleep cycle.

Moreover, if performing an access to a second femto base station selected from femto base stations included in the prescribed area, the mobile station uses the sleep mode operation timing point of the first femto base station obtained using the received sleep mode information.

To further achieve these and other advantages and in accordance with the purpose of the present invention, a method of saving power in a femto base station includes the steps of obtaining paging information of at least one mobile station shifting to an idle mode within the femto base station and if the at least one mobile station enters the idle mode within the femto base station, shifting to a sleep mode in consideration of the obtained information of the at least one mobile station.

Preferably, the paging information includes at least one of a paging cycle, a paging offset and paging listening interval information. The paging cycle includes a paging listening interval and a paging unavailable interval. The step of shifting to the sleep mode can be performed if a condition that the at least one or more mobile stations are in the paging unavailable interval is met.

Preferably, the method can further include the step of shifting to a normal mode if any one of the at least one or more mobile stations is not in the paging unavailable interval.

Preferably, the femto base station shares reference synchronization information with at least one other femto base station located within a prescribed area to which the femto base station belongs. And, the step of shifting to the sleep mode can be performed by being synchronized with the shared reference synchronization information.

To further achieve these and other advantages and in accordance with the purpose of the present invention, a mobile station includes a processor and a radio communication (RF) module configured to transceive a radio signal externally under the control of the processor, wherein the processor controls the radio communication module to receive a super frame header (SFH) and a synchronization channel from a first femto base station entering a sleep mode by being synchronized with reference synchronization information used for a prescribed area, wherein the processor detects a cell identifier and CGS identifier of the first femto base station by decoding at least one of the super frame header (SFH) and the synchronization channel, wherein if the first femto base station is the femto base station to which the mobile station has subscribed to, the processor controls the radio communication module to perform an access to the first femto base station, and wherein each of the femto base stations included in the prescribed area achieves synchronization of a sleep mode operation using the reference synchronization information.

Preferably, the reference synchronization information includes a sleep cycle, a listening interval and an absolute or relative start frame number.

More preferably, the processor controls the radio communication module to receive sleep mode information from the first femto base station or a macro base station and wherein the processor performs the access to the first femto base station by controlling the radio communication module to transmitting a prescribed code or message to the first femto base station by obtaining a sleep mode operation timing point of the first femto base station using the received sleep mode information.

In this case, the sleep mode information includes at least one selected from the group consisting of a start frame of the sleep mode, a sleep cycle and a listening interval according to the reference synchronization information. And, the prescribed code or message is transmitted to the first femto base station via a preset uplink resource of an available interval in the sleep cycle.

Moreover, if performing an access to a second femto base station selected from femto base stations included in the prescribed area, the processor uses the sleep mode operation timing point of the first femto base station obtained using the received sleep mode information.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, using embodiments of the present invention, it is able to minimize power consumption of a femto base station and interference with a macro cell in a wireless access system supporting a femtocell.

Secondly, using embodiments of the present invention, a mobile station within a femtocell is able to perform reliable communications despite that a femto base station operates in a power saving mode.

Thirdly, using embodiments of the present invention, a mobile station is able to scan entire femto base stations or heterogeneous femto base stations existing within a prescribed area more efficiently.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
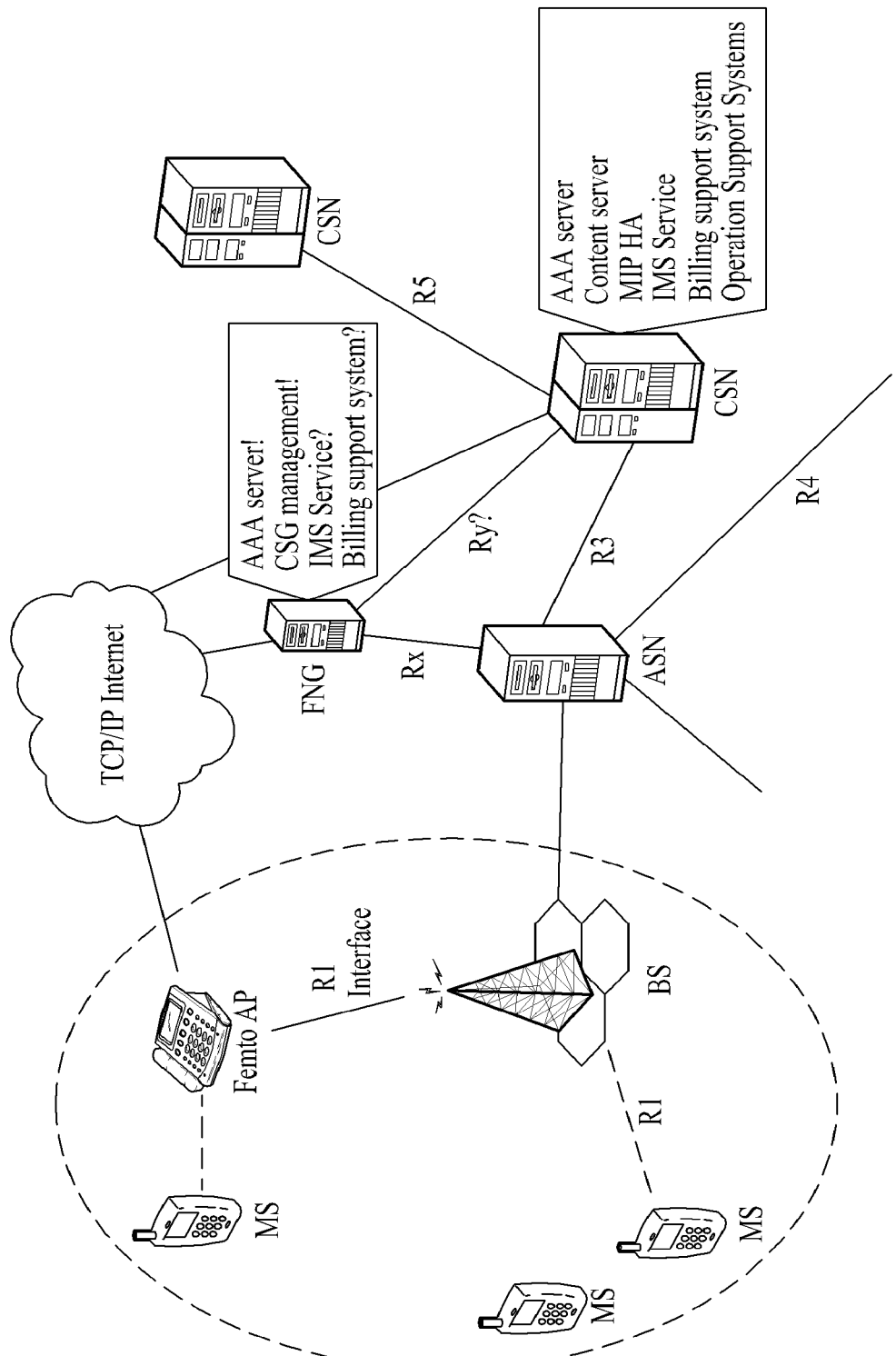
FIG. 1 is a diagram for an example of a network structure including a femto base station (FBS)

The present invention relates to a wireless access system. Reference will now be made in detail to a method of minimizing power consumption of a femto base station according to various embodiments of the present invention, examples of which are illustrated in the accompanying drawings.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of the drawings, procedures, steps and/or the like are not described to avoid making the gist of the present invention unclear.

In this disclosure, embodiments of the present invention are described centering on the data transmission/reception relations between a base station and a mobile station. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a mobile station can be performed by a base station or other networks except the base station. In this case, 'base station' can be replaced by such a terminology as a fixed station, a Node B, an eNode B (eNB), an access point and the like. And, 'mobile station' can be replaced by such a terminology as a user equipment (UE), a subscriber station (SS), a mobile subscriber station (MSS)' and the like.

Moreover, a transmitting side means a node configured to transmit a data or speech service and a receiving side means a node configured to receive the data or speech service. Therefore, in uplink, a terminal becomes a transmitting side and a base station can become a receiving side. On the contrary, in downlink, a terminal becomes a receiving side and a base station can become a transmitting side.

Besides, a mobile station of the present invention can include a PDA (personal digital assistant), a cellular phone, a PCS (personal communication service) phone, a GSM (global system for mobile) phone, a WCDMA (wideband CDMA) phone, an MBS (mobile broadband system) phone or the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by at least one of P802.16-2004, P802.16e-2005, and P802.16Rev2 documents which are the standards of IEEE 802.16 system.

In the following description, specific terminologies are provided to help the understanding of the present invention. And, the use of the specific terminology can be modified into another form within the scope of the technical idea of the present invention.

First Embodiment

A first embodiment of the present invention provides a method of saving power in a manner that a femto base station enters a sleep mode by being synchronized with other femto base stations within a prescribed area.

According to the present embodiment, assume that a synchronization channel transmitted by a femto base station is synchronized with that of at least one different femto base station located within a prescribed area to which the corresponding femto base station belongs. In this case, the prescribed area, to which the femto base station belongs, can include an area corresponding to a whole network, a coverage area of a macro base station (MBS) or an area corresponding to a macro cell or at least one paging group. Moreover, assume that every femto base station appearing in the present embodiment exist within the prescribed area.

First of all, a femto base station is able to determine whether a sleep mode shift condition is met to shift to a sleep mode. This is explained with reference to FIG. 2 as follows.

Figure 2:
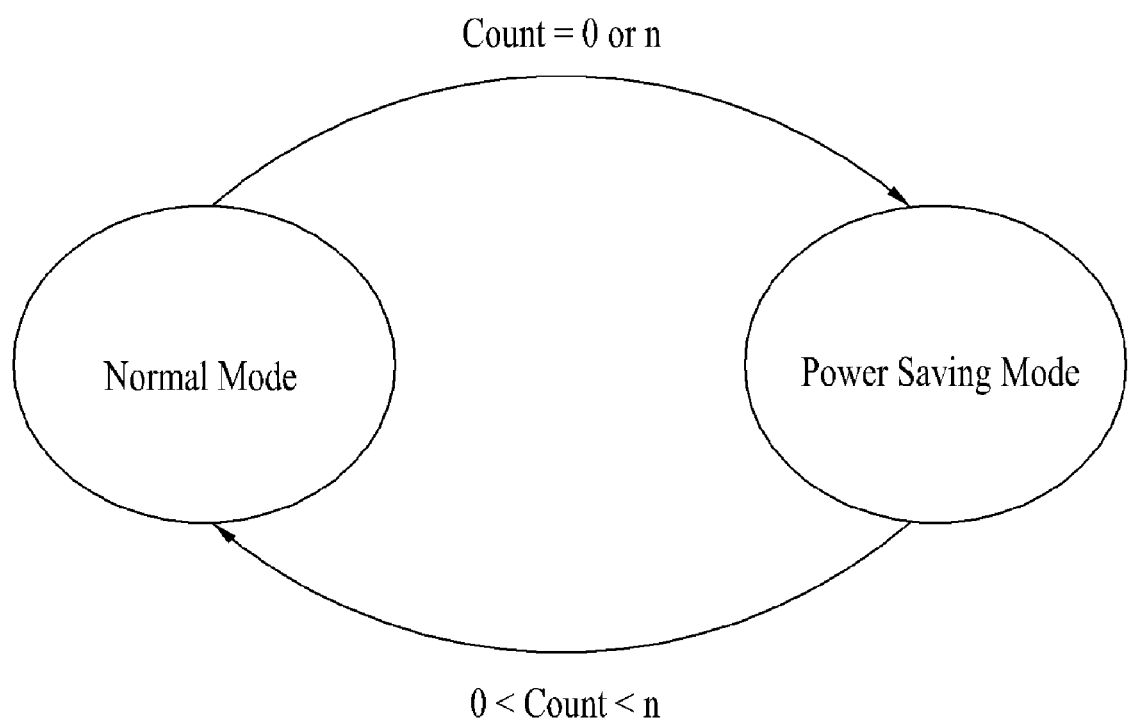
FIG. 2 is a diagram for variations of a power mode of a femto base station according to a first embodiment of the present invention.

FIG. 2 is a diagram for variations of a power mode of a femto base station according to a first embodiment of the present invention.

Referring to FIG. 2, a femto base station can mainly have two states. In particular, the femto base station operates in a normal mode or a sleep mode. In the sleep mode, power consumption can be reduced in a manner that a femto base station broadcasts at least one of synchronization information (e.g., P-SCH, S-SCH) and a super frame header (SFH) for a prescribed interval in a femtocell area or monitors a presence or non-presence of uplink transmission of a mobile station. In this case, the sleep mode can be called a low duty mode.

If a specific condition is met, a femto base station shifts one state to another state. For instance, a femto base station is able to manage and operate a prescribed count that can be determined as the number of mobile stations subscribed to a CSG of the femto base station. In particular, when the number of mobile stations subscribed to a CSG is n, if a counter value is 'n', it means that all mobile stations subscribed to the CSG have entered a cell area of a femto base station. If a counter value is '0', it means a state that all mobile stations have moved away from a cell area of a femto base station or a case that all mobile stations enter an idle mode or a sleep mode.

Namely, if a value of a count shown in FIG. 2 is set to 0 or n, the femto base station is able to shift to a power saving mode (i.e., a sleep mode or a low duty mode) from a normal mode. Therefore, the femto base station broadcasts minimum signals transmitted to mobile stations in the power saving mode and stops the rest of operations, thereby minimizing its power consumption.

Preferably, since the present embodiment does not consider a paging cycle of a mobile station having shifted to the idle mode, a specific condition for the femto base station to shift to the sleep mode is a case that a mobile station does not exist within the femto base station.

In the following description, the low duty mode, to which the femto base station can shift if the above mentioned sleep mode shift condition is met, is explained with reference to FIG. 3.

Figure 3:
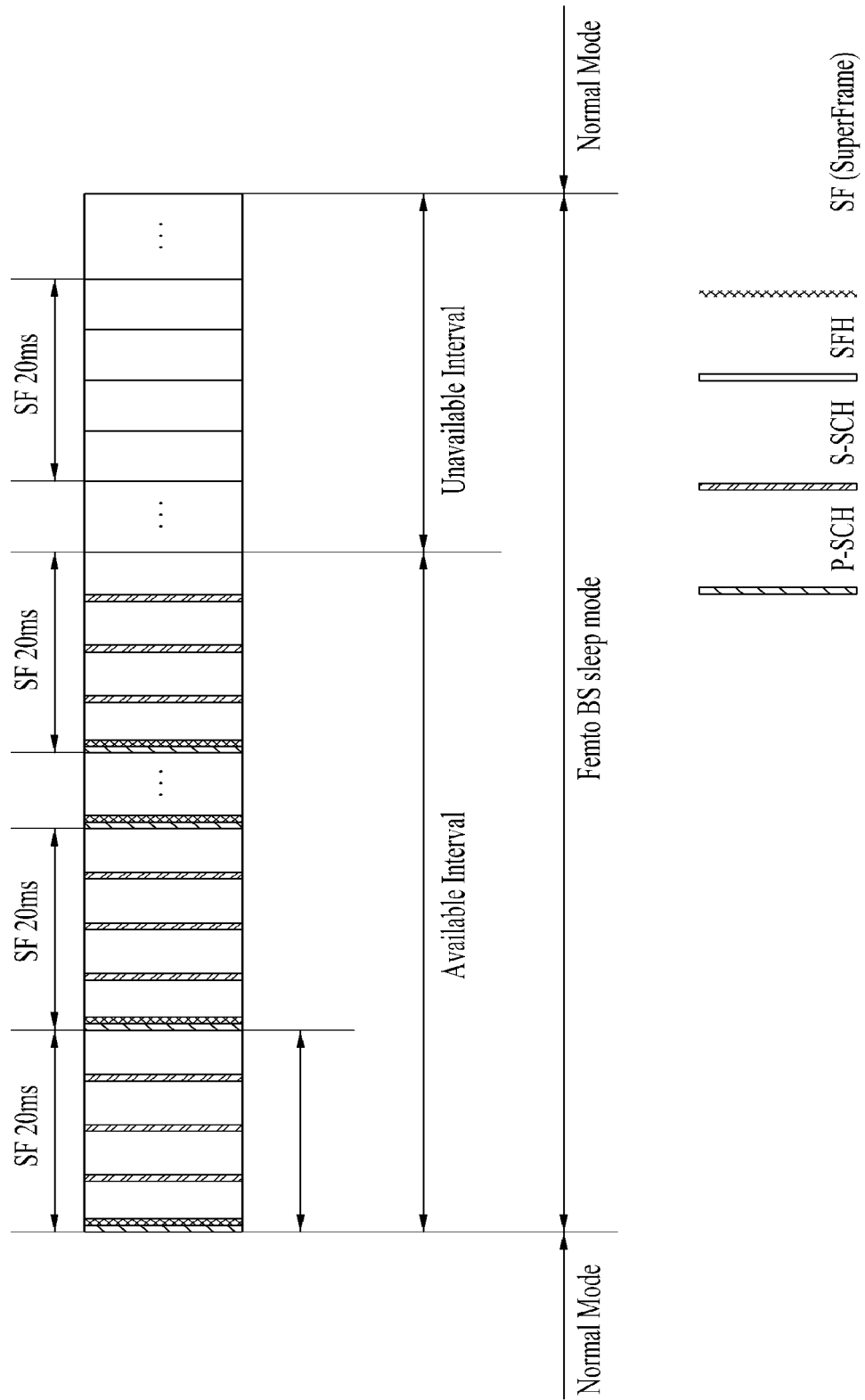
FIG. 3 is a diagram for a sleep cycle of a femto base station operating periodically to reduce power consumption and interference on an air interface according to a first embodiment of the present invention.

FIG. 3 is a diagram for a sleep cycle of a femto base station operating periodically to reduce power consumption and interference on an air interface according to a first embodiment of the present invention.

Referring to FIG. 3, a sleep cycle of a femto base station can be constructed with an available interval and an unavailable interval. The femto base station plays the following role in each of the intervals.

First of all, in the available interval, the femto base station is able to transmit a synchronization channel and/or a super frame header (SFH) to mobile stations in downlink. And, the femto base station is able to monitor whether an access attempt transmitted by a mobile station, e.g., a ranging code transmission exists, for a preset uplink interval.

Secondly, in the unavailable interval, the femto base station does not transmit or receive any information by wireless in a manner of cutting off uplink and downlink during the unavailable interval. Through this, the femto base station mitigates interference with a neighbor femto base station using the same frequency band or a macro base station as well as reduces power consumption.

The femto base station enables either the available interval or the unavailable interval to start in the sleep cycle including the available interval and the unavailable interval.

Yet, in order for a femto base station to enter a sleep mode by being synchronized with other femto base stations, a reference for matching the synchronization is required. In this case, 'entering the sleep mode by matching the synchronization' means that all femto base stations having shifted to the sleep mode within a prescribed area simultaneously repeat a sleep cycle of the same length at the same timing point. In other words, if a random femto base station operating in a sleep mode exists in an available interval, all other femto base stations operating in a sleep mode within a prescribed area exist in the available interval as well, and vice versa.

Therefore, proposed is a reference including a sleep cycle for enabling all femto base stations to operate in a sleep mode by being synchronized with each other, a listening interval and an absolute or relative start frame number. This is named 'reference synchronization information' or 'low duty pattern'.

Reference synchronization may indicate that a sleep cycle having preset available and unavailable intervals with reference to a prescribed timing point keeps being repeated irrespective of a presence or non-presence of sleep mode shift of each femto base station. This can be determined by at least one of a macro base station responsible for a prescribed area, a paging controller and a femto base station.

Alternatively, the reference synchronization information may indicate a sleep cycle including an available interval and an unavailable interval, which are set by a femto base station having shifted to a sleep mode in the first place among femto base stations. In this case, the sleep cycle set by the femto base station having shifted to the sleep mode in the first place can be maintained as the reference synchronization information.

Alternatively, if a femto base station operating in a sleep mode does not exist, a sleep cycle of a random femto base station shifting to a sleep mode in a next turn by being reset can be determined as new reference synchronization information.

The reference synchronization information determined by the above mentioned method can be sustained by at least one of a macro base station responsible for a prescribed area, at least one femto base station and a paging controller. And, the corresponding reference synchronization information can be shared with other femto base stations via a backbone network or a prescribed message broadcasted by the macro base station by wireless.

Figure 4:
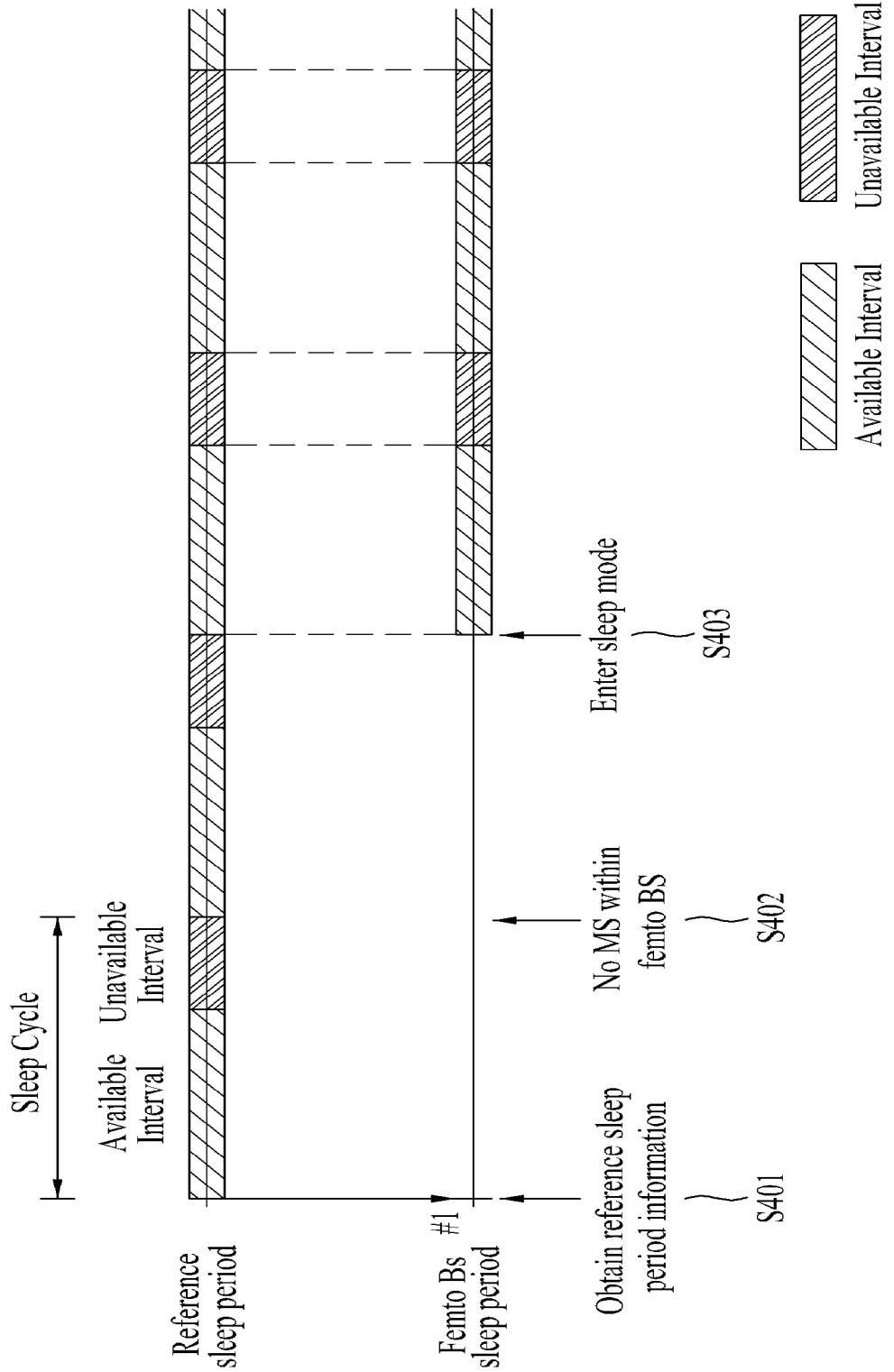
FIG. 4 is a diagram for an example of an operation of a femto base station shifting to a sleep mode by being synchronized with reference synchronization information according to a first embodiment of the present invention.

In the following description, explained with reference to FIG. 4 is a case that a femto base station shifts to a sleep mode on a reference sleep time set irrespective of a presence or non-presence of sleep mode shifts of other femto base stations. FIG. 4 is a diagram for an example of an operation of a femto base station shifting to a sleep mode by being synchronized with reference synchronization information according to a first embodiment of the present invention.

Referring to FIG. 4, it can be observed that reference synchronization information repeated by a prescribed sleep cycle is set irrespective of a presence or non-presence of sleep mode shift of other femto base stations. A femto base station (Femto BS #1) is able to obtain this reference synchronization information from at least one of a macro base station, another femto base station and a paging controller [S401].

Subsequently, if a mobile station does not exist within the femto base station, the corresponding the femto base station is able to meet a condition for entering a sleep mode of the present invention [S402].

The femto base station is able to shift to the sleep mode by keeping pace with the reference synchronization information the moment a mobile station does not exist. Alternatively, the femto base station is able to shift to the sleep mode by keeping pace with synchronization of a start of a new sleep cycle of reference synchronization information coming in the first place after a mobile station does not exist within the femto base station [S403].

The femto base station enters the sleep mode by the above process and is then able to perform the sleep mode by repeating an available interval and an unavailable interval according to the reference synchronization information until a mobile station enters a coverage area of the femto base station and then attempts an access.

Figure 5:
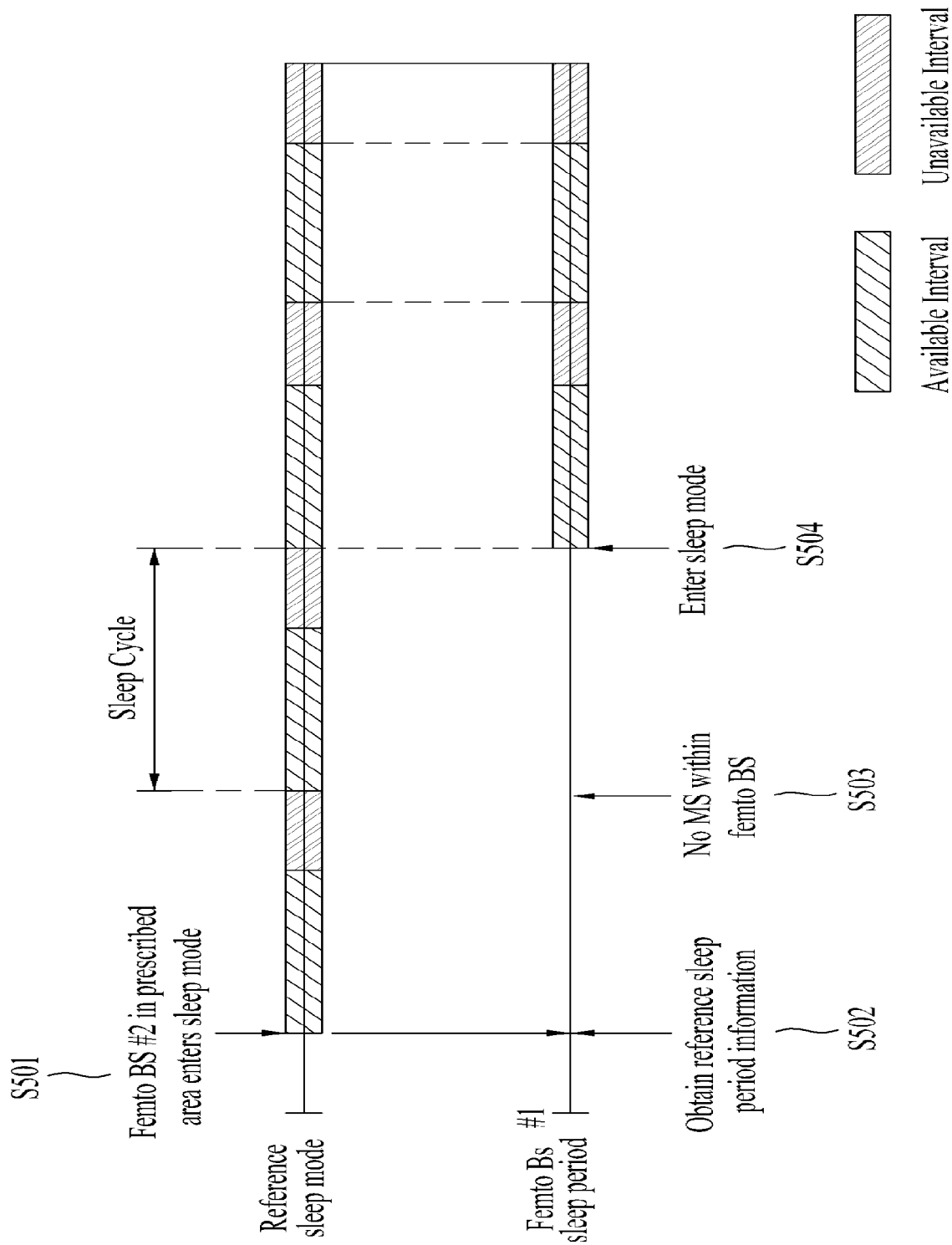
FIG. 5 is a diagram for another example of an operation of a femto base station shifting to a sleep mode by being synchronized with reference synchronization information according to a first embodiment of the present invention.

In the following description, explained with reference to FIG. 5 is a case that reference synchronization information is set to a sleep cycle having been set by a femto base station having shifted to a sleep mode in the first place. FIG. 5 is a diagram for another example of an operation of a femto base station shifting to a sleep mode by being synchronized with reference synchronization information according to a first embodiment of the present invention.

Referring to FIG. 5, when any femto base station has not shifted to a sleep mode, assuming a situation that there is no preset reference synchronization information, one femto base station Femto BS #2 is able to enter a sleep mode in the first place [S501].

In this case, the reference synchronization information can keep being set to the sleep mode set by the femto base station Femto BS #2 having shifted to the sleep mode in the first place and another femto base station Femto BS #1 is able to obtain information on the reference synchronization information [S502].

Subsequently, if a mobile station does not exist in a coverage area of the femto base station Femto BS #1, the corresponding femto base station Femto BS #1 can enter a sleep mode [S503].

In this case, the femto base station Femto BS #1 directly shifts to the sleep mode by keeping pace with the reference synchronization information or is able to shift to the sleep mode by keeping pace with synchronization of a start of a new sleep cycle of reference synchronization information coming in the first place after a mobile station does not exist within the coverage area of the femto base station [S504].

Figure 6:
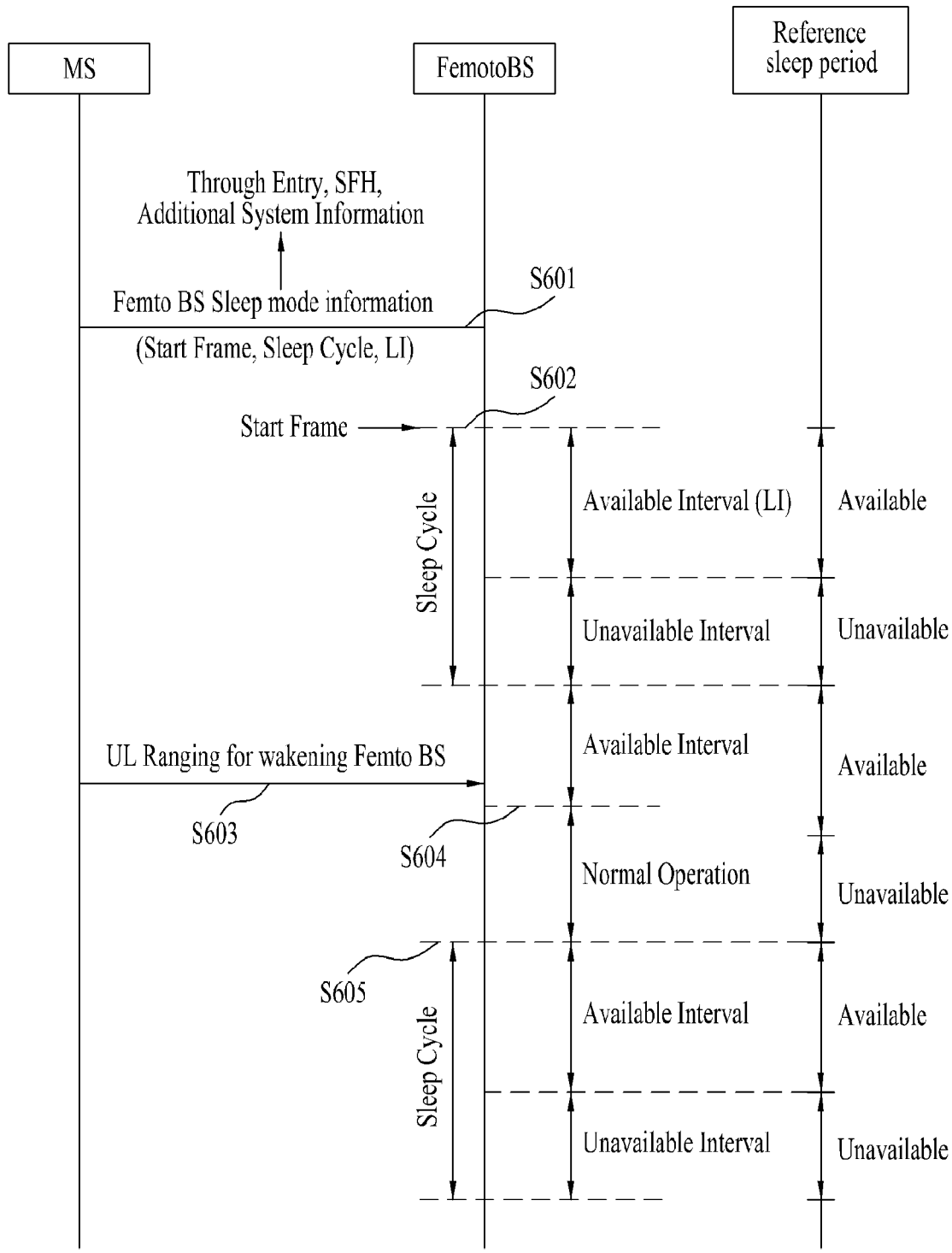
FIG. 6 is a diagram for an example of operations of a mobile station and a femto base station according to a first embodiment of the present invention.

A process for a mobile station to attempt an access to a femto base station having entered a sleep mode by the above method is explained with reference to FIG. 6 as follows. FIG. 6 is a diagram for an example of operations of a mobile station and a femto base station according to a first embodiment of the present invention. In FIG. 6, assume that reference synchronization information is previously set and shared with all femto base stations within a prescribed area and that the reference synchronization information keeps being maintained.

Referring to FIG. 6, if a mobile station enters a network of a femto base station, it is able to obtain sleep mode information from the femto base station [S601]. In this case, the sleep mode information means the information that can be transmitted to a mobile station to enable a femto base station to be aware that a femto base station operates in a sleep mode of a prescribed type. And, the sleep mode information can be called 'low duty pattern' information as well.

The following information is addible to the sleep mode information.

1) Start frame: This means a frame number of a timing point for a femto base station to start shifting to a sleep mode. According to the present invention, this may include a frame number of a timing point for starting a new sleep cycle of a basic sleep period.

2) Sleep cycle: This is an interval for which a femto base station operates in a sleep mode and can be set by a super frame unit.

3) Listening interval: This indicates an available interval in the period for which a femto base station operates in a sleep mode. For this interval, a femto base station transmits synchronization channel information and super frame header (SFH) to a mobile station and is able to monitor whether a ranging attempt transmitted by the mobile station exists during a preset uplink interval.

Comparing sleep mode information to reference synchronization information, a sleep cycle and listening interval of the sleep mode information may be equal to those of the reference synchronization information. Yet, a start frame of the sleep mode information may differ from that of the reference synchronization information according to a timing point for a femto base station to inform a mobile station of the sleep mode information.

This sleep mode information can be transmitted to a mobile station in various ways. For instance, if a mobile station attempts an initial entry or location update to a femto base station or a macro base station, sleep mode information is transmitted to the mobile station by being included in a ranging response (RNG-RSP) message. For this, the ranging response message can contain the following contents shown in Table 1.

Table 1

TABLE 1

| Syntax | Size (bit) | Notes |
|---|---|---|
| MOB_RNG-RSP_Message_format ( ) { | — | — |
| ~ | | |
| Start Frame | | Frame number of the timing point at which a femto base station shifts to a sleep mode |
| Sleep Cycle | | Interval for which a femto base station operates in a sleep mode (SuperFrame unit) |
| LI (Listening Interval) | | This indicates an available interval in a period during which a femto base station operates in a sleep mode. Namely, in this interval, a femto base station is able to transmit synchronization information and super frame header to mobile stations in downlink. And, a mobile station monitors whether a ranging attempt transmitted by a mobile station exists in a preset uplink interval. |
| ~ | | |
| } // End of MOB_RNG-RSP | | |

For another example, sleep mode information can be transmitted to a mobile station by being included in a super frame header (SFH) broadcasted by a macro base station or a femto base station operating in a sleep mode.

For further example, a method of transmitting sleep mode information to a mobile station using additional system information is explained with reference to FIG. 7 as follows.

Figure 7:
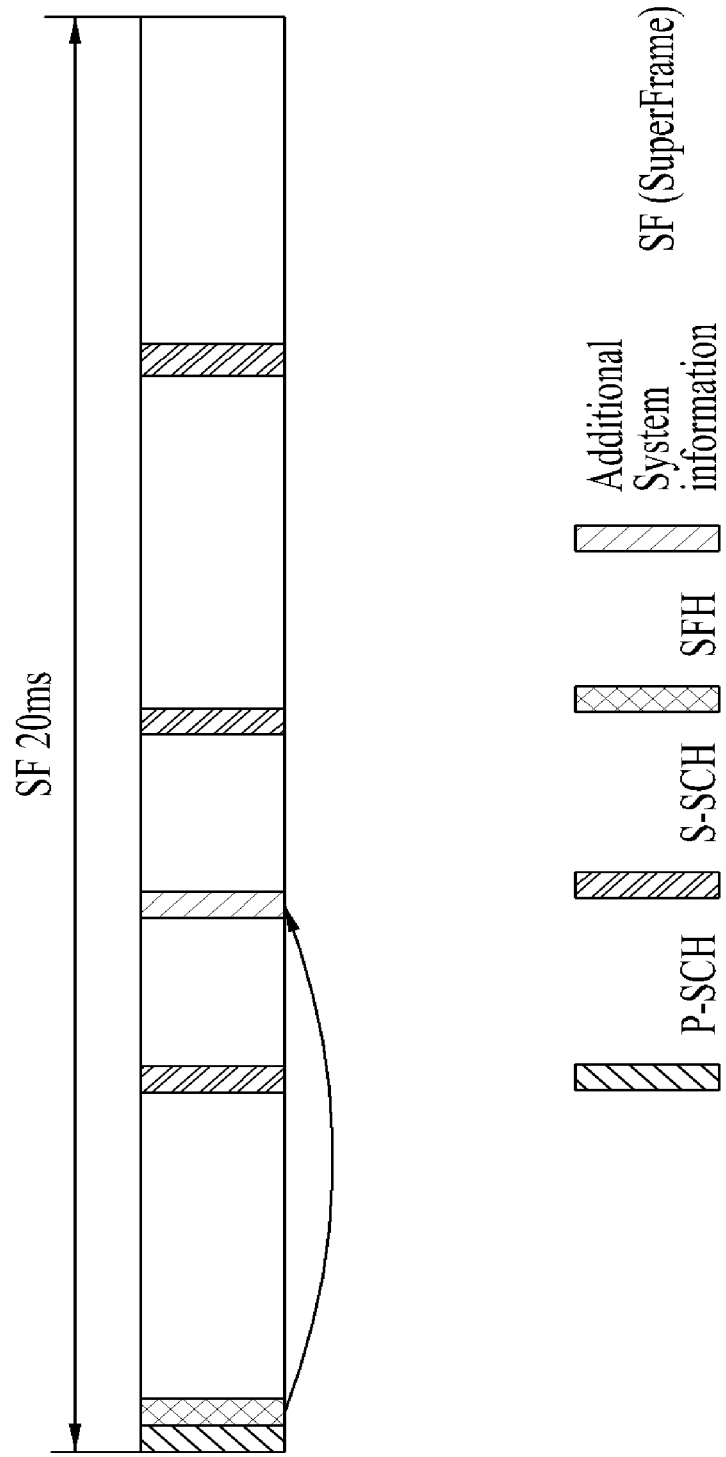
FIG. 7 is a diagram for an example of a method for a femto base station to inform a mobile station of sleep mode information according to one embodiment of the present invention.

FIG. 7 is a diagram for an example of a method for a femto base station to inform a mobile station of sleep mode information according to one embodiment of the present invention.

Referring to FIG. 7, a subframe number indicating a position of additional system information containing sleep mode information within a corresponding super frame can be included in a super frame header (SFH). A mobile station is aware of a subframe number carrying the sleep mode information by decoding the super frame header SFH and is able to obtain the sleep mode information by checking the corresponding subframe. In this case, the additional system information can include DCD (downlink channel descriptor).

Alternatively, the sleep mode information can be transmitted to a mobile station by being included in a neighbor advertisement (MOB_NBR-ADV) message sent by a macro base station or a femto base station. This neighbor advertisement message can be broadcasted by the macro base station or the femto base station or can be unicasted to the mobile station via a unicast neighbor advertisement (unicast MOB_NBR-ADV) message.

Moreover, the sleep mode information can be delivered to a mobile station by being included in a dedicated message, e.g., a femtocell base station low duty mode indication (FCB-LDM-IND: FemtoCellBS-Low_Duty_Mode-Indication) message. The FCB-LDM-IND message can be unicasted to the mobile station fro a macro base station or a femto base station (unicast FCB-LDM-IND) or can be broadcasted.

Referring now to FIG. 6, if a mobile station does not exist within the coverage area, the femto base station is able to enter a sleep mode by keeping pace with the start frame included in the sleep mode information [S602]. In this case, a timing point indicated by the start frame can be the timing point from which a new sleep cycle of the reference synchronization information starts. Having entered the sleep mode, the femto base station is able to perform the sleep mode by repeating the available interval and the unavailable interval by being synchronized with the reference synchronization information.

Subsequently, the mobile station is able to obtain information on the femto base station by decoding the synchronization channel (e.g., P-SCH, S-SCH, etc.) transmitted by the femto base station. For instance, the mobile station is able to match time synchronization with the base station by decoding P-SCH. Having matched the time synchronization, the mobile station is able to obtain cell identifier (cell ID) information by decoding S-SCH. Moreover, the mobile station decodes P-SCH and S-SCH and is then able to decode the super frame header (SFH). In this case, control informations used by the base station can be contained in the super frame header.

Yet, according to an embodiment of the present invention, if an identifier of a base station or a macro base station or type information indicating whether a corresponding cell area is a femtocell area or a macro cell area is included in P-SCH, a mobile station is able to obtain control information by decoding the P-SCH and then decoding a super frame header.

The mobile station, which has obtained the base station information and the synchronization information by the above described method, determined that the femto base station is accessible, the mobile station is able to waken the femto base station in a power saving mode by performing an initial access to the femto base station [S603]. For this, the mobile station is able to send an initial ranging code or a ranging request (RNG-REQ) message to the femto base station using an uplink resource preset in the available interval of the sleep cycle of the femto base station.

If the initial access request is received from the mobile station, the femto base station wakes up from the sleep mode and is then able to perform a normal mode operation [S604].

Subsequently, if a mobile station does not exist within the network again, the femto base station is able to enter a sleep mode by being synchronized with the reference synchronization information [S605].

Figure 8:
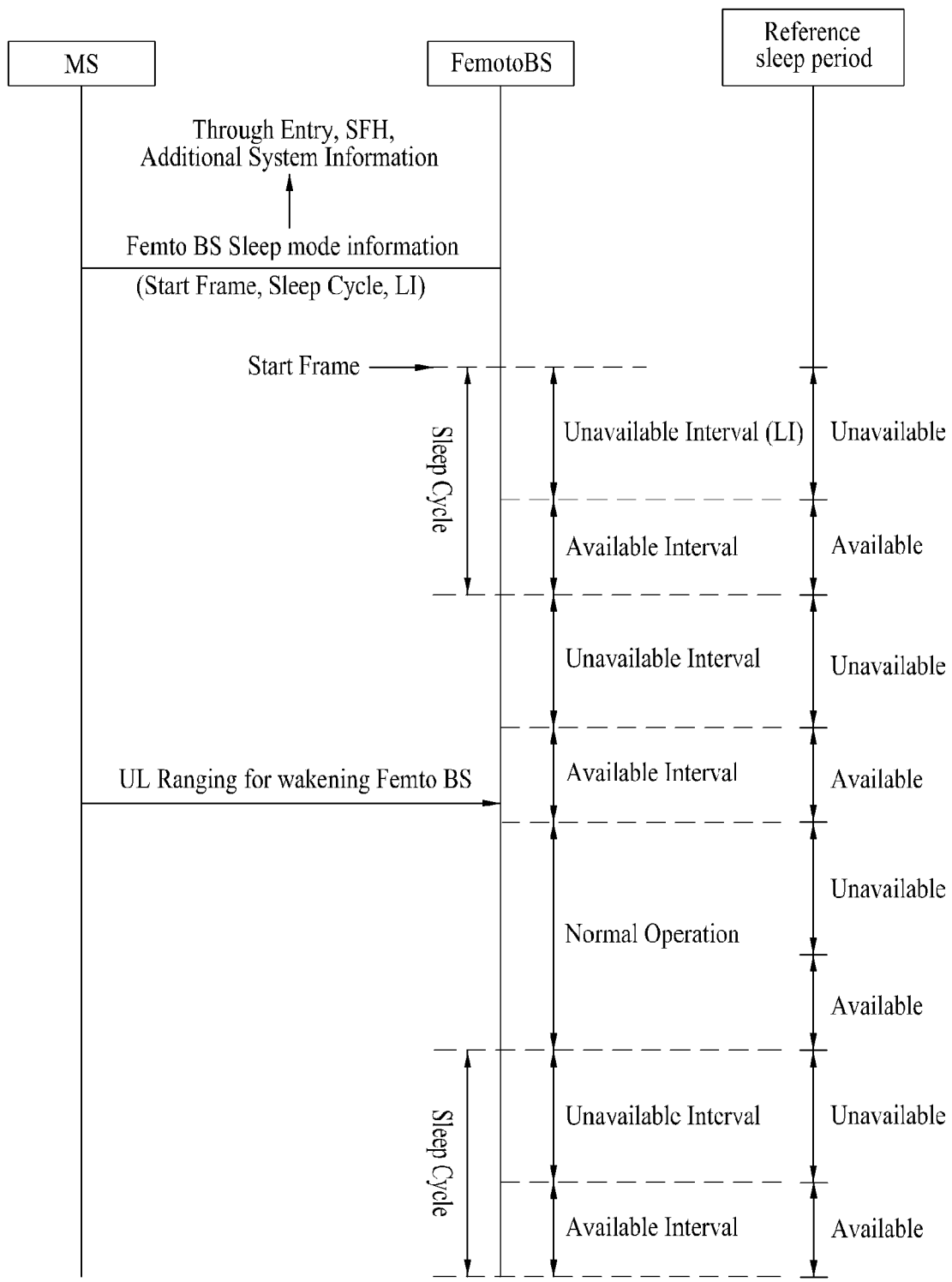
FIG. 8 is a diagram for another example of operations of a mobile station and a femto base station according to a first embodiment of the present invention.

In the following description, explained with reference to FIG. 8 is a case that the unavailable interval in a sleep cycle of a basic sleep period starts in the first place.

FIG. 8 is a diagram for another example of operations of a mobile station and a femto base station according to a first embodiment of the present invention.

Referring to FIG. 8, a process for a femto base station to operate in a sleep mode is basically identical to the former process described with reference to FIG. 6. Yet, it can be observed this process is set in a manner that an unavailable interval in a sleep cycle of a basic sleep period starts in the first place and that an available interval follows the unavailable interval. For clarity, the overlapped parts are omitted from the following description. If the unavailable interval in the sleep cycle is set to start in the first place, it can be usefully applied to a case of determining that it is highly probable that another mobile station will not enter a coverage area of a femto base station right after a mobile station does not exist in the coverage area of the femto base station.

Meanwhile, as mentioned in the foregoing description, all femto base stations within a prescribed area perform sleep mode operations by keeping pace with synchronization with reference synchronization information. Accordingly, if a mobile station recognizes a sleep mode operation timing point of a femto base station by obtaining sleep mode information once, the mobile station is able to efficiently reuse the obtained sleep mode information without update in case of attempting an access to another femto base station operating in sleep mode. Moreover, if a whole radio communication network is working on the same frequency, it is able to reduce interference by matching reference synchronization informations of femto base stations.

The present embodiment makes a description of a case that one reference synchronization information exists within a prescribed area. Yet, at least two reference synchronization informations may exist.

For instance, femto base stations operating on a frequency f1 can operate in sleep mode by being synchronized with reference synchronization information different from that of other femto base stations operating on a frequency f2.

For another instance, according to a type of a femto base station located within a prescribed area, reference synchronization information can be provided different for each type. In particular, femto base stations, to which a closed subscriber group (CGS) is applied, operate in sleep mode according to first reference synchronization information. And, femto base stations, to which an open subscriber group (OGS) is applied, operate in sleep mode according to second reference synchronization information. Moreover, CSG-Closed type femto base stations, which do not provide any service to a mobile station failing to subscribe to a CSG, among CSG-applied femto base stations can operate in sleep mode according to reference synchronization information different from that of CSG-Open type femto base stations providing preset minimum service to the mobile station failing to subscribe to a CSG. In this case, a size of the prescribed area may include an area corresponding to a macro cell.

As the heterogeneous femto base stations are made to operate in sleep mode according to the same reference synchronization information, it is able to minimize interference between femto base stations. Moreover, if a mobile station obtains sleep mode information according to reference synchronization information once, it is further facilitated to scan a heterogeneous femto cell.

Second Embodiment

According to another embodiment of the present invention, if every mobile station existing within a cell area of a femto base station is in idle mode, the femto base station is able to operate in sleep mode by keeping pace with paging cycles, paging offsets and paging listening intervals of mobile stations.

For instance, a femto base station performs a normal operation (16 m super frame transmission) in a paging listening interval of a mobile station, i.e. an available interval and is able to shift to a sleep mode in a paging unavailable interval of the mobile station, i.e., an unavailable interval (e.g., paging cycle). In this case, the sleep mode performed by the femto base station can be divided into an available interval and an unavailable interval. An operation performed in each of the intervals is identical to the former operation of the first embodiment and its overlapped description is omitted from the following description.

Yet, in order for a femto base station to operate in a power saving mode by keeping pace with paging cycle, if all mobile stations within a femtocell area have the same paging listening interval, paging unavailable period, paging offset and the like, the femto base station repeats a sleep mode and a normal mode alternately by keeping pace with them. Yet, if any one of mobile stations within a coverage area of a femto base station has a different paging cycle, a method of saving power of the femto base station is requested. This is explained with reference to FIG. 9 as follows.

Figure 9:
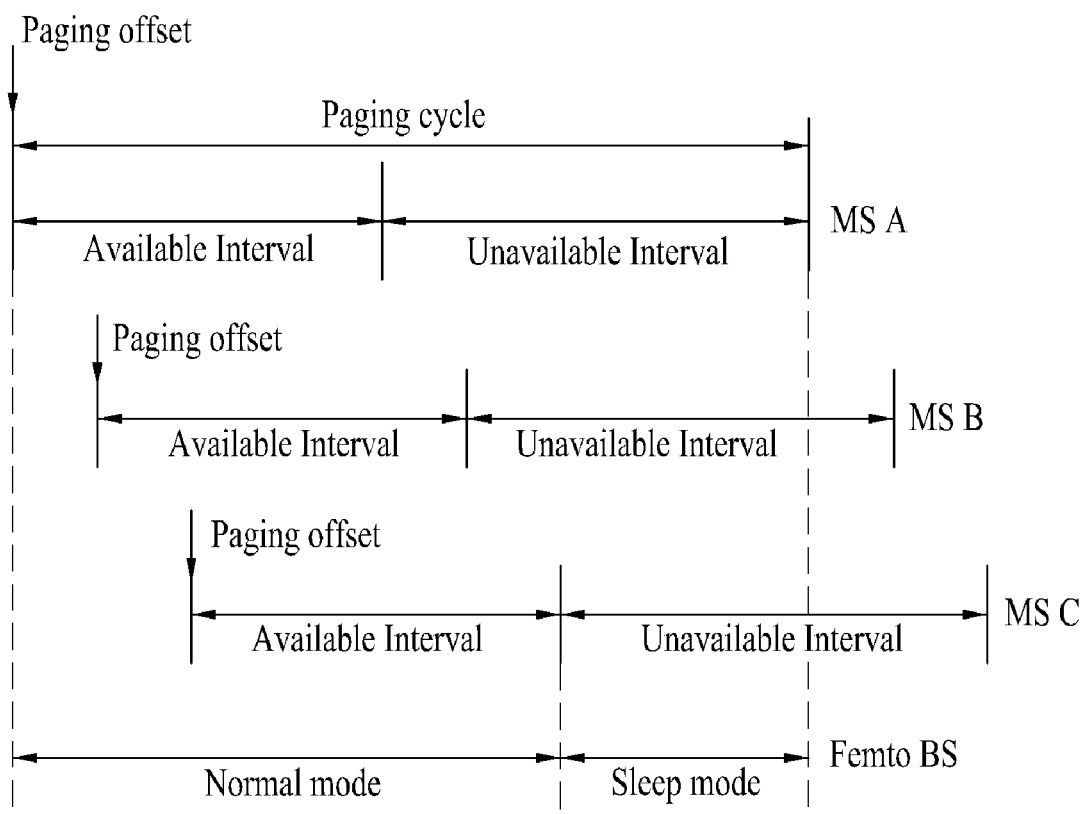
FIG. 9 is a diagram for a power saving method in a femto base station in consideration of different paging cycles of a plurality of mobile stations according to a second embodiment of the present invention.

FIG. 9 is a diagram for a power saving method in a femto base station in consideration of different paging cycles of a plurality of mobile stations according to a second embodiment of the present invention.

Referring to FIG. 9, three mobile stations MS A, MS B and MS C exist within a coverage area of a femto base station. And, it can be observed that each of the mobile stations shifts to an idle mode with a different paging cycle and a different paging offset.

When each of the mobile stations shifts to an idle mode, the femto base station is able to exchange a deregistration request (DREG-REQ) message and a deregistration command (DREG-CMD) message with the corresponding mobile station. In this course, the femto base station is able to obtain information on the paging cycle, paging offset and paging listening interval of the corresponding mobile station. Since all mobile stations within the area of the femto base station have entered the idle mode, the femto base station is able to shift to a sleep mode for power saving.

In doing so, in case of receiving a paging notification notifying that there is a call or packet to deliver to at least one of the three mobile stations from a paging controller, the femto base station should inform the corresponding mobile station of the paging notification via a paging message within a paging listening interval of the corresponding mobile station. Therefore, the femto base station preferable operates in a normal mode if any one of the mobile stations existing within a coverage area of the femto base station. On the contrary, if the three mobile stations stay in the paging unavailable interval, the femto base station is able to operate in a sleep mode.

Consequently, the femto base station is able to repeat the sleep mode and the normal mode until one of the three mobile stations shifts to the normal mode, as shown in FIG. 9.

Like the first embodiment, according to the present embodiment, all femto base stations within a prescribed area are able to repeat an available interval and an unavailable interval by keeping pace with reference synchronization information.

Figure 10:
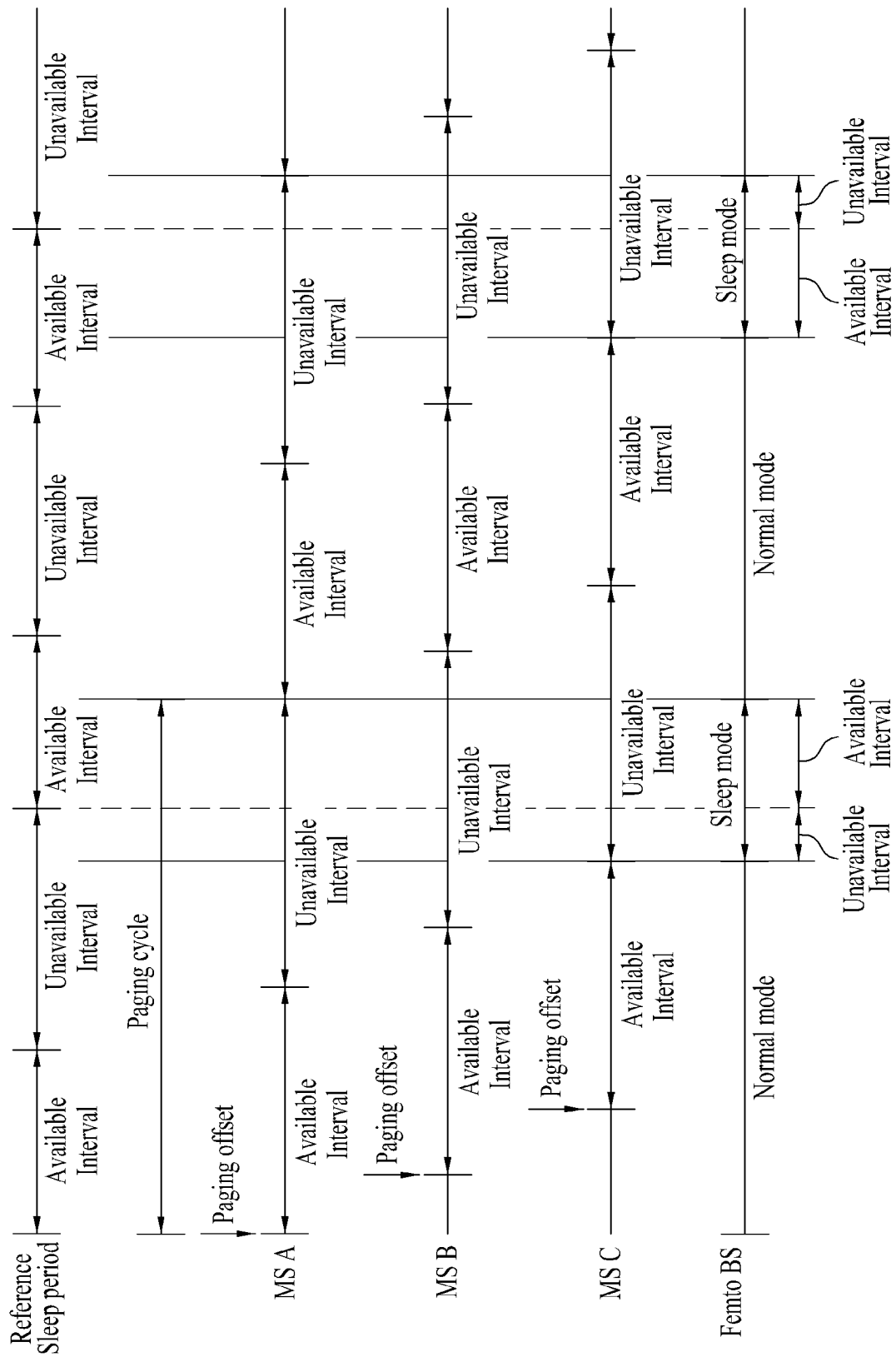
FIG. 10 is a diagram for a power saving method in a femto base station in further consideration of reference synchronization information according to a second embodiment of the present invention.

FIG. 10 is a diagram for a power saving method in a femto base station in further consideration of reference synchronization information according to a second embodiment of the present invention.

Referring to FIG. 10, like FIG. 9, it can be observed that three mobile stations MS A, MS B and MS C shift to idle mode within a network with different paging cycles and different paging offsets, respectively. In this case, assume that a preset reference sleep period is shared with all femto base stations within a prescribed area.

A femto base station is able to repeat a sleep mode and a normal mode by the same method described with reference to FIG. 9. As the femto base station is aware of preset reference synchronization information, the femto base station is able to save power by performing the sleep mode by being synchronized with the reference synchronization information in case of repeating an available interval and an unavailable interval in the sleep mode.

Once a mobile station is aware of a sleep mode operation timing point of a femto base station by obtaining sleep mode information one time, in case of attempting an access to another femto base station operating in a sleep mode within a prescribed area, it is efficient because the mobile station is able to reuse the obtained sleep mode information without update.

According to another embodiment of the present invention, a mobile station and base station (FBS, MBS), on which the above described embodiments of the resent invention can be performed, are explained as follows.

First of all, a mobile station works as a transmitter in uplink and is able to work as a receiver in downlink. A base station works as a receiver in uplink and is able to work as a transmitter in downlink. In particular, each of the mobile station and the base station can include a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like. Examples of these transmitting and receiving sides are explained with reference to FIG. 11 as follows.

Figure 11:
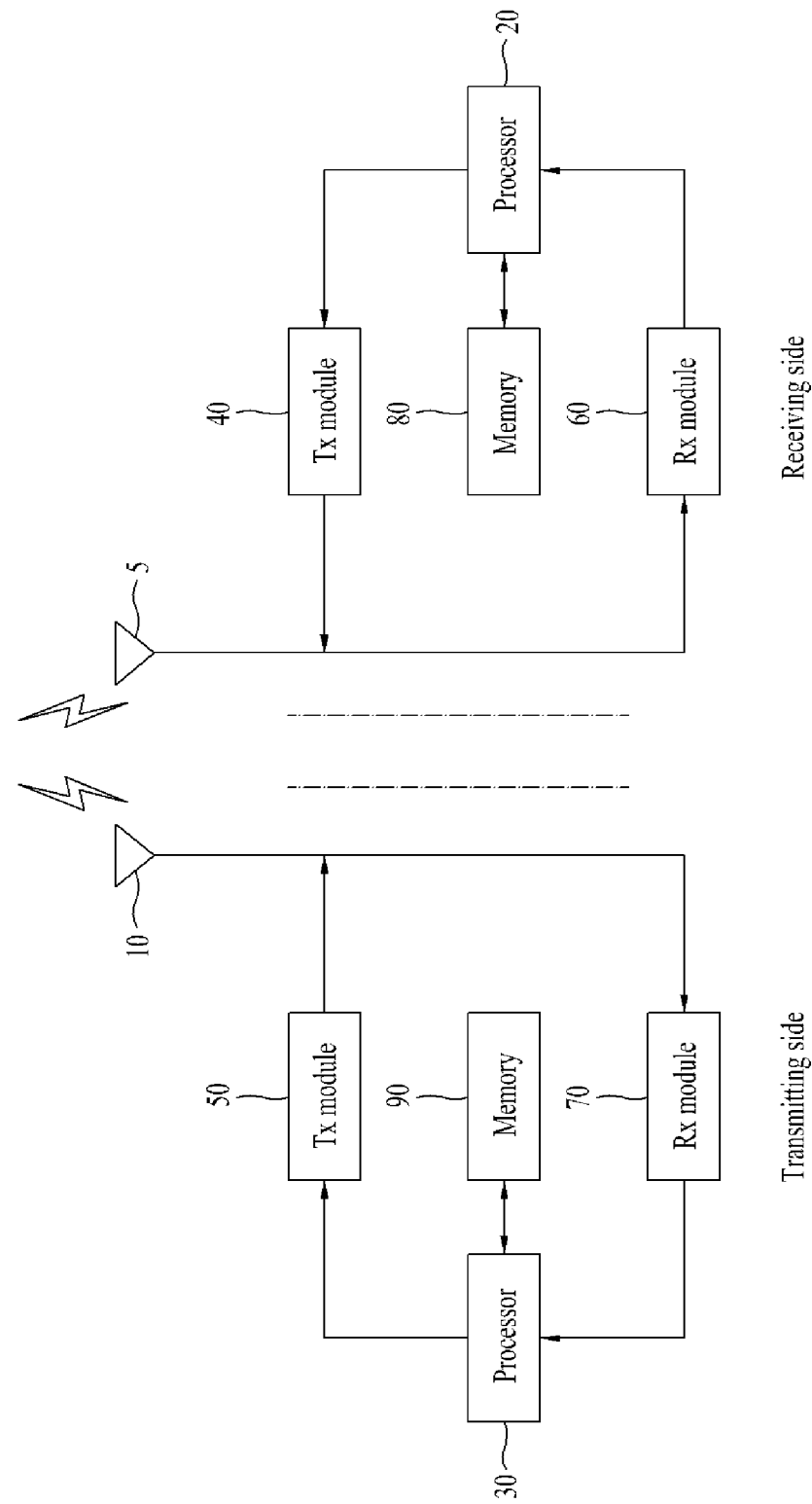
FIG. 11 is a block diagram for an example of a transmitting and receiving side structure according to another embodiment of the present invention.

FIG. 11 is a block diagram for an example of a transmitting and receiving side structure according to another embodiment of the present invention.

Referring to FIG. 11, a left side shows a structure of a transmitting side and a right side shows a structure of a receiving side. The transmitting/receiving side can include an antenna 5/10. a processor 20/30, a transmitting (Tx) module 40/50, a receiving (Rx) module 60/70 and a memory 80/90. Each of the elements can perform a corresponding function. The respective elements are explained in detail as follows.

First of al, the antenna 5/10 performs a function of transmitting a signal generated by the Tx module 40/50 externally or a function of receiving a radio signal externally and then delivering the received radio signal to the Rx module 60/70. If MIMO function is supported, at least two antennas can be provided.

The antenna, Tx module and Rx module can configure a radio communication (RF) module.

The processor 20/30 controls overall operations of the transmitting or receiving side in general. For instance, the processor 20/30 can perform a controller function for performing the above described embodiments of the present invention, a MAC (medium access control) frame variable control function, a handover function, an authentication function, an encryption function and the like.

Particularly, a processor of a mobile station receives a super frame header and a synchronization channel from a femto base station having entered a sleep mode by being synchronized with reference synchronization information and is then able to control overall operations of the mobile station attempting an access to the femto base station.

For instance, a processor receives a super frame header (SFH) and synchronization channel from a first femto base station having entered a sleep mode by being synchronized with reference synchronization information and then detects a cell ID and CSG ID of a femto base station by decoding at least one of the super frame header (SFH) and the synchronization channel. If the femto base station is the femto base station to which a mobile station has subscribed, the processor is able to control the radio communication module to perform an access to the corresponding femto base station.

For another instance, a processor controls a radio communication module to receive sleep mode information from a femto base station or a macro base station and then obtains a sleep mode operation timing point of the femto base station using the received sleep mode information. Therefore, the processor controls the radio communication module to transmit a prescribed code or message to the femto base station to perform an access to the corresponding femto base station.

Moreover, a processor of a base station interprets a MAC message or data received from a mobile station, allocates an uplink resource necessary for the mobile station, generates an uplink grant for informing the mobile station of the allocation history and the like, and is then able to perform scheduling for transmitting the uplink grant and the like.

The Tx module 40/50 performs prescribed coding and modulation on data, which is scheduled to be externally transmitted by the processor 20/30, and is then able to deliver the coded and modulated data to the antenna 10/5.

The Rx module 60/70 reconstructs a radio signal externally received via the antenna 5/10 into original data by performing decoding and demodulation on the radio signal and is then able to deliver the reconstructed original data to the processor 20/30.

A program for processing and control of the processor 20/30 can be stored in the memory 80/90. And, the memory 20/30 can perform a function for temporary storage of inputted/outputted data (e.g., sleep mode information according to reference synchronization information, etc.). Moreover, the memory 80/90 can include at least one storage medium of such a type as a flash memory type, a hard disk type, a multimedia card micro type, a card type of memory (e.g., SD memory, XD memory, etc.), a Random Access Memory (RAM) type, an SRAM (Static Random Access Memory type), a Read-Only Memory (ROM) type, an EEPROM (Electrically Erasable Programmable Read-Only Memory) type, a PROM (Programmable Read-Only Memory) type, a magnetic memory type, a magnetic disc type, and optical disc type, and the like.

Meanwhile, a base station uses at least one of the above mentioned modules to perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function and the like or can further include separate means, modules and/or parts for performing these functions.

INDUSTRIAL APPLICABILITY

Accordingly, the present invention is applicable to various wireless access systems.

And, 3GPP (3rd generation partnership project), 3 GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Moreover, claims failing to be explicitly cited in-between are combined to construct new embodiments or can be included as new claims by Amendment after filing the application.

The invention claimed is:

1. A method of a low duty mode (LDM) operation carried out by a femto base station, the method comprising:
    determining whether there are no mobile stations attached to the femto base station; and
    entering the LDM operation according to LDM pattern parameters for the LDM when it is determined that there are no mobile stations attached to the femto base station,
    wherein the LDM pattern parameters include information related to an available interval and information related to a LDM start timing, and
    wherein the LDM operation is performed by:
    activating an air interface during the available interval, and
    deactivating transmission on the air interface during an unavailable interval based on the LDM pattern parameters,
    wherein a length of the available interval is in unit of four frames,
    wherein each of the four frames has a length of 5 ms, and
    wherein a length of the unavailable interval is in unit of four frames.

2. The method of claim 1, wherein the femto base station enters the LDM operation based upon the information related to the LDM start timing.

3. The method of claim 1, wherein each of a plurality of femto base stations included in a prescribed area perform the LDM operation using the LDM pattern parameters.

4. The method of claim 1, further comprising transmitting information on the LDM pattern parameters to a mobile station through a unicast message during a network entry of the mobile station.

5. A femto base station of performing a low duty mode (LDM) operation, the femto base station comprising:
    a processor; and
    a radio communication (RF) module configured to transceive a radio signal externally under the control of the processor,
    wherein the processor is configured to:
    determine whether there are no mobile stations attached to the femto base station; and
    enter the LDM operation according to LDM pattern parameters for the LDM, when the processor determines that there are no mobile stations attached to the femto base station,
    wherein the LDM pattern parameters include information related to an available interval and information related to a LDM start timing, and
    wherein the LDM operation is performed by:
    activating an air interface during the available interval; and
    deactivating transmission on the air interface during an unavailable interval based on the LDM pattern parameters,
    wherein a length of the available interval is in unit of four frames,
    wherein each of the four frames has a length of 5ms, and
    wherein a length of the unavailable interval is in unit of four frames.

6. The femto base station of claim 5, wherein the processor is further configured to enter the LDM operation based upon the information related to the LDM start timing.

7. The femto base station of claim 5, wherein the processor is further configured to transmit information on the LDM pattern parameters to a mobile station through a unicast message during an initial network entry of the mobile station.

* * * * *